US012312086B2

(12) United States Patent
Ruiz Lara et al.

(10) Patent No.: US 12,312,086 B2
(45) Date of Patent: May 27, 2025

(54) CONTROLLER FEEDBACK SYSTEM

(71) Applicant: B/E Aerospace, Inc., Winston-Salem, NC (US)

(72) Inventors: Oscar Ruiz Lara, Kirkland, WA (US); Travis K. Finlay, Winston-Salem, NC (US); Travis J. Vaninetti, Bothell, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/134,995

(22) Filed: Apr. 14, 2023

(65) Prior Publication Data

US 2024/0343391 A1   Oct. 17, 2024

(51) Int. Cl.
B64D 11/00 (2006.01)
B64D 11/06 (2006.01)

(52) U.S. Cl.
CPC .... B64D 11/00155 (2014.12); B64D 11/0624 (2014.12)

(58) Field of Classification Search
CPC . B64D 11/06; B64D 11/0641; B64D 11/0643; B64D 11/0606; B64D 11/0602; B64D 11/064; B64D 11/0646; B64D 11/0647; B64D 11/0624; B64D 11/00155; B64D 11/0604; B64D 11/0639; B64D 11/0015; B64D 11/003; B64D 11/0601; B64D 11/0638; B64D 11/0605; B64D 2011/0046; B64D 11/0636; B64D 11/0698; B64D 2011/0069; B64D 11/06395; B64D 11/0642; B64D 11/0023; B64D 11/0696; B64D 11/0644; B64D 11/062;

(Continued)

(56) References Cited

U.S. PATENT DOCUMENTS 6,899,390 B2   5/2005   Sanfrod et al.
8,751,971 B2   6/2014   Fleizach
(Continued)

FOREIGN PATENT DOCUMENTS

| CN | 108140429 A | 6/2018 |
| EP | 1065638 A3 | 1/2004 |
| EP | 3015959 A1 | 5/2016 |
| EP | 3106343 A1 * | 12/2016 |
| EP | 3957564 A1 | 2/2022 |

OTHER PUBLICATIONS

European Search Report received in EP Application No. 24170054, Sep. 4, 2024, 9 pages.

*Primary Examiner* — Eric Blount
(74) *Attorney, Agent, or Firm* — Suiter Swartz IP

(57) ABSTRACT

An aircraft seat may include an integrated controller feedback system. The controller feedback system may include a user interface device at least partially embedded within an armrest console of the aircraft seat. The user interface device may include a control panel, one or more buttons, one or more sensors, and/or a controller. The one or more buttons may indicate a controllable feature of the feedback system. The one or more sensors may be aligned with the one or more buttons and may be able to distinguishably detect a user touch from a user press. The controller may be in communication with the one or more sensors. The controller may generate one or more feedback signals in response to a user touch, and/or generate one or more activation signals in response to a user press.

16 Claims, 6 Drawing Sheets

(58) Field of Classification Search
CPC ............ B64D 2011/0053; B64D 11/00; B64D 11/00153; B64D 11/0627; B64D 11/04; B64D 2045/007; B64D 45/0005; B64D 45/0051; B60N 2/34; B60N 3/063; B60N 2/345; B60N 2/0292; B60N 2/0296; B60N 2/32; B60N 2/757; B60N 3/004; B60N 2/0228; B60N 2/643; B60N 2/7011; B60N 2/0237; B60N 2/002; B60N 2/02; B60N 2/0231; B60N 2/0239; B60N 2/2222; B60N 2/77; B60N 2/853; B60N 2/865; B60N 2/885; B60N 2/90; B60N 2/995; B60N 2210/12; B60N 2220/20
USPC ....................................................... 340/815.4
See application file for complete search history.

(56) References Cited

U.S. PATENT DOCUMENTS

| | | | |
|---|---|---|---|
| 9,102,244 B2* | 8/2015 | Kawachi | B60N 2/0228 |
| 9,898,725 B2 | 2/2018 | Davis et al. | |
| 10,303,252 B2 | 5/2019 | Chaudhri et al. | |
| 10,466,883 B2 | 11/2019 | Fleizach et al. | |
| 10,604,048 B2* | 3/2020 | Vela | B64D 11/064 |
| 11,472,558 B2* | 10/2022 | Fagan | B64D 11/06395 |
| 2009/0102805 A1 | 4/2009 | Meijer et al. | |
| 2011/0174926 A1 | 7/2011 | Margis et al. | |
| 2020/0070982 A1 | 3/2020 | Mayne et al. | |
| 2020/0339266 A1* | 10/2020 | McMillan | H04W 4/80 |
| 2020/0380995 A1 | 12/2020 | Wlodkowski et al. | |

* cited by examiner

CONTROLLER FEEDBACK SYSTEM

TECHNICAL FIELD

The present invention generally relates to seat controller feedback, and, more particularly, to a system and method providing visual and auditive feedback to a visually impaired user in response to an interaction with a seat controller.

BACKGROUND

Aircraft seats in passenger seating systems within an aircraft cabin are configured to allow a passenger to rest in one or more seating positions. In addition, the passenger seating systems may include one or more passenger amenities for comfort and/or entertainment. The aircraft seats and the passenger amenities may be controlled by a passenger occupying a passenger seating system via a controller proximate to an aircraft seat within the passenger seating system. In general, the more buttons and adjustable features included with the controller, the smaller the buttons must be. As a result, it may be difficult for some passengers to decipher which buttons control which features based on the icon or symbol displayed. In addition, the passenger seating systems are growing ever more private, limiting the passenger's ability to ask for help or guidance from others. Consequently, passengers with visual impairments and the like have difficulty managing the features of their seating systems.

SUMMARY

An aircraft seat controller feedback system is disclosed, in accordance with one or more embodiments of the present disclosure. In some embodiments, the seat controller feedback system may include a user interface device. The user interface device may include at least one of a control panel, one or more buttons integrated within the control pane, and/or one or more sensors. The one or more buttons may indicate a controllable feature within an aircraft to a user. The one or more sensors may be configured to distinguish and detect a user touch versus a user press of the one or more buttons. In some embodiments, the controller feedback system may include a controller communicatively coupled to the user interface device. The controller may be configured to generate one or more signals in response to the user input being received via the user interface device. In some embodiments, the one or more sensors may transmit one or more feedback signals to the controller to provide feedback to the user in response to a user touch. In some embodiments, the one or more sensors may transmit one or more activation signals to the controller to activate the feature associated with the selected one or more buttons.

A passenger seating system is disclosed, in accordance with one or more embodiments of the present disclosure. In some embodiments, the passenger seating system may include an aircraft seat. The aircraft seat may include a seat frame configured to actuate between at least an upright position and a bed position. The aircraft seat may include at least one power output configured to drive an actuation of the seat frame. The aircraft seat may further include a user interface device at least partially embedded in a cavity defined within an armrest console of the aircraft seat, wherein the cavity is accessible via at least one exterior surface of the armrest console. The user interface device may include at least one of a control panel, one or more buttons integrated within the control pane, and/or one or more sensors. The one or more buttons may indicate a controllable feature within an aircraft to a user. The one or more sensors may be configured to distinguish and detect a user touch versus a user press of the one or more buttons. In some embodiments, the controller feedback system may include a controller communicatively coupled to the user interface device. The controller may be configured to generate one or more signals in response to the user input being received via the user interface device. In some embodiments, the one or more sensors may transmit one or more feedback signals to the controller to provide feedback to the user in response to a user touch. In some embodiments, the one or more sensors may transmit one or more activation signals to the controller to activate the feature associated with the selected one or more buttons.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
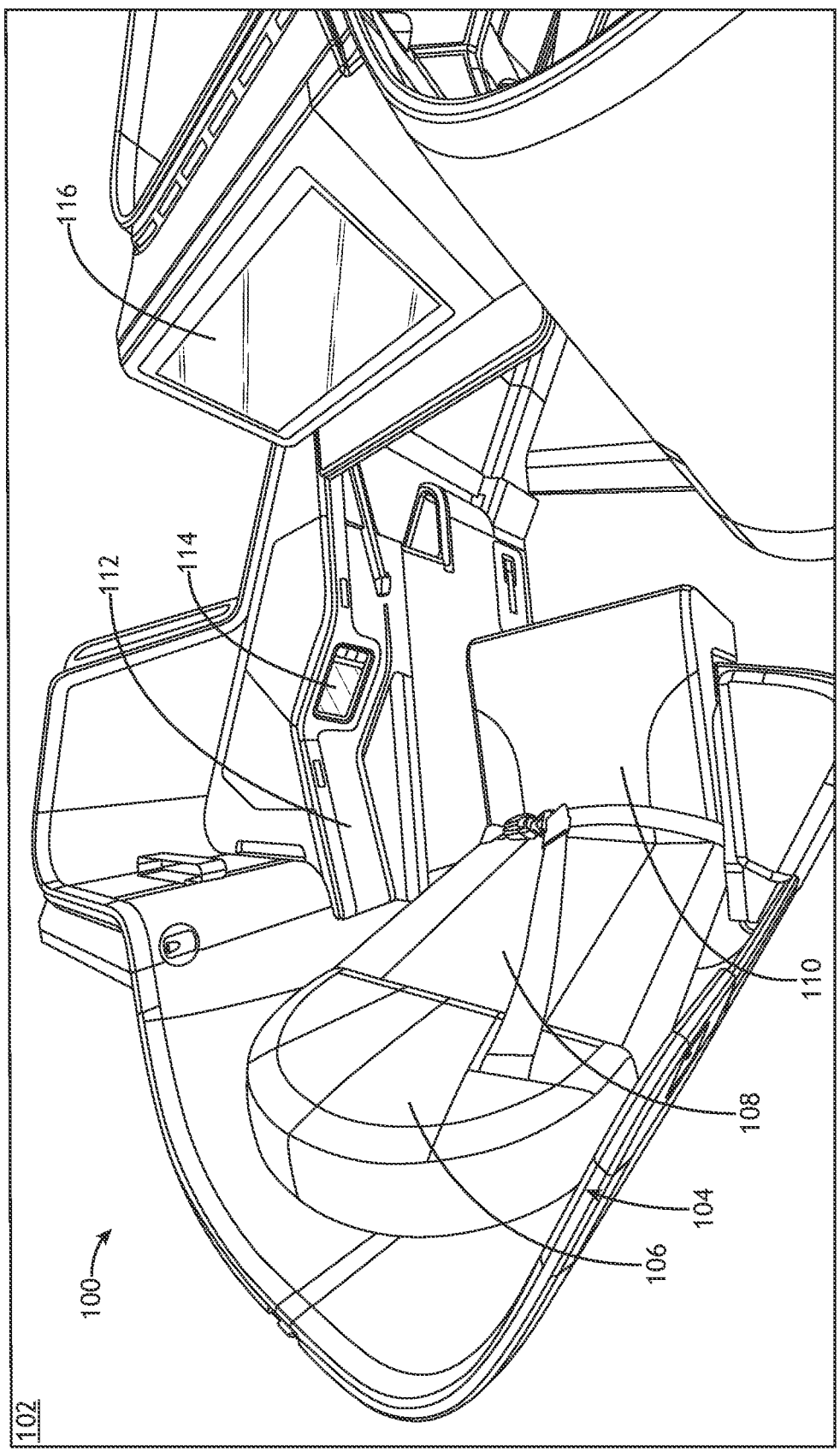
FIG. 1 illustrates a perspective view of a passenger seating system including an integrated controller feedback system, in accordance with one or more embodiments of the present disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a controller feedback system. The system may be integrated within a non-vehicular system or a system which includes a vehicle (e.g., aircraft, watercraft, automobile, train, etc.). In addition, the controller feedback system may be used in any suitable environment.

In some embodiments, the controller feedback system may include a control panel with one or more buttons, where each button is associated with a controllable feature. Each button may also have a sensor which is able to distinguishably detect a user's touch, press, or hold. In some embodiments, a user's touch triggers a feedback message, which indicates, to the user, the feature associated with the selected button. In some embodiments, the user may utilize this feature in order to find a specific button. In some embodiments, a user's touch may also provide further information to the user such as, but not limited to, how to use the button, a current status of the feature, and the like. In some embodiments, a user's press may cause the controller to activate and/or identify the feature of the selected button.

In some embodiments, the controller feedback system may be integrated within a passenger seating system located within an aircraft. Further, the controller feedback system may be integrated within an aircraft seat of the passenger seating system. Aircraft seats installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

A controller feedback system integrated within an aircraft passenger seating system may help passenger's control the various features within the passenger seating system (e.g., adjustable features related to the comfortability of the passenger, adjustable features related to the In-flight Entertainment (IFE), or any adjustable features known in the art). The controller feedback system may also help guide technologically challenged passengers on how to take advantage of all the features within their control. Further, the controller feedback system may help passengers with visual limitations (e.g., near-sightedness, blindness, or the like) by providing auditory and/or enhanced visual feedback of the various features within their control.

Figure 2:
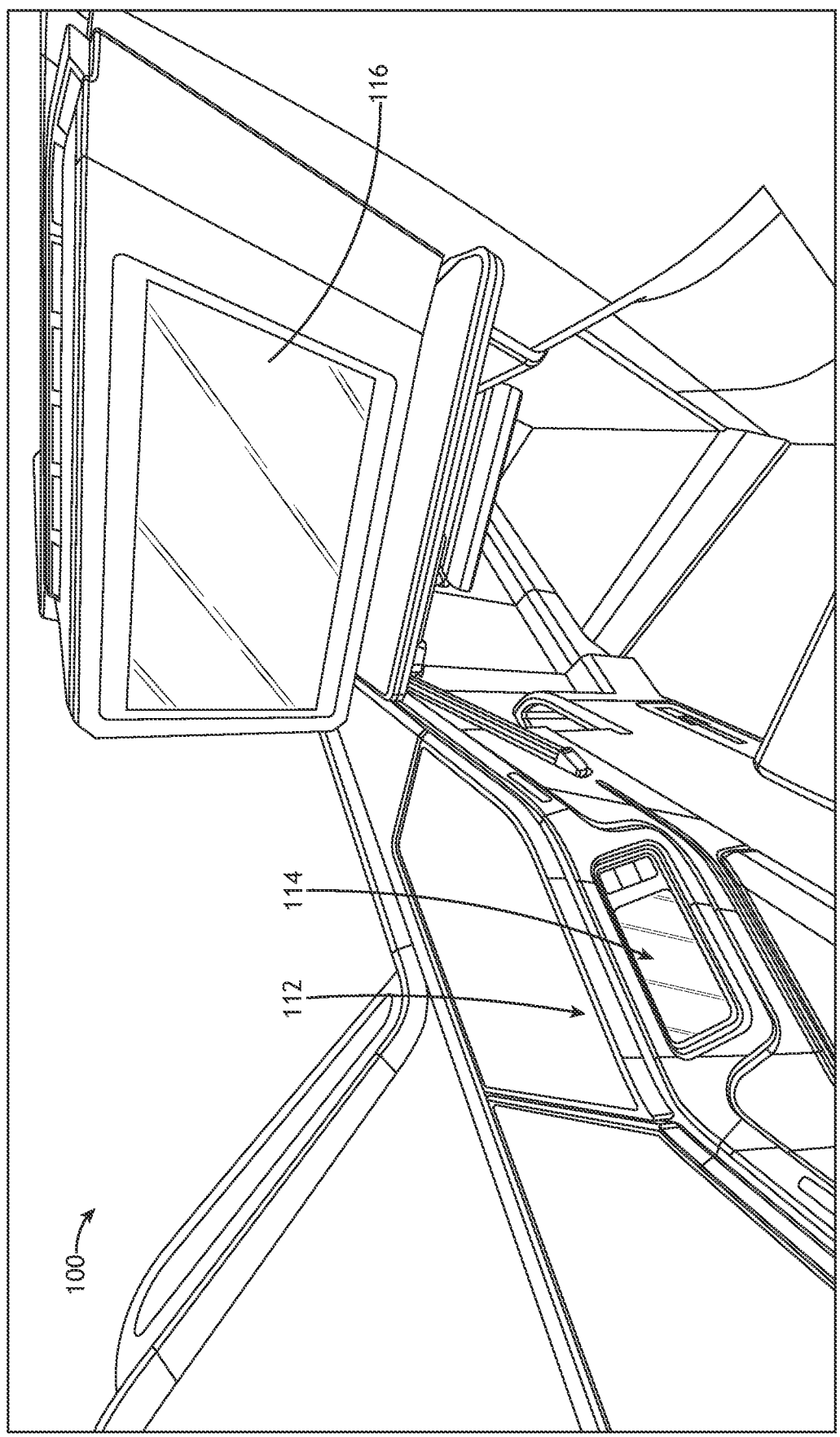
FIG. 2 illustrates a perspective view of a passenger seating system including an integrated controller feedback system, in accordance with one or more embodiments of the present disclosure.

Referring now to FIGS. 1-2, a perspective view of a passenger seating system 102 including an integrated controller feedback system 100 is illustrated, in accordance with one or more embodiments of the present disclosure. It is noted herein that the term "integrated controller feedback system" and variants of the term including, but not limited to, "controller feedback system," "integrated feedback system," "system," or the like may be considered equivalent for purposes of the disclosure.

In some embodiments the passenger seating system 102 may include aircraft seats 104, rows, or the like, in a passenger cabin of an aircraft or any other vehicle. The aircraft seats 104 may include a traditional economy style seat, a divan, a suite-style seat, a seat with reclinable features, a bed-style seat, a couch-style seat, or any other aircraft seating style known in the art. In an exemplary embodiment, the system 100 is incorporated into an aircraft seat 104 (e.g., a business-class or elite-class compartment) aboard a commercial aircraft or like seating area aboard a business jet or luxury aircraft.

The passenger seating system 102 may include a privacy shell. The privacy shell may include an opening into the passenger seating system 102. The passenger seating system 102 may include a door for entering the privacy shell. The passenger seating system 102 may also include any form of entry into the privacy shell that is known in the art. The passenger seating system 102 may include an aircraft seat 104 configured to fit within a privacy shell. The passenger seating system 102 may also be configured to fit one or more aircraft seats 104 within the privacy shell.

The aircraft seat 104 may be configured to fit within the privacy shell when transitioning between positions (e.g., between an upright position and a bed position). The aircraft seat 104 may include one or more upper body support members. For example, the one or more upper body support members may include, but are not limited to, a head rest 106 and a seat back cushion 108. It is noted herein, at least one of the head rest or the seat back cushion may be adjustable, removeable, or the like. The aircraft seat 104 may include one or more lower body support members. For example, the one or more lower body support members may include, but are not limited to, a seat pan cushion 110 and a leg rest.

In some embodiments, the upper body support members and the lower body support members may be separate structures disposed adjacent to one another. Alternatively, the upper body support members and the lower body support members may have one or more shared components. For example, the upper body support members and the lower body support members may have a shared cushion or covering, one or more shared mechanical linkages, and/or one or more shared actuators. The upper body support members may be configured to move relative to the lower body support members. For example, the upper body support members may be configured to transition between upright and bed positions. In some embodiments, the lower body support members are also repositionable. For example, the lower body support members may be configured to move forward/backward, upward/downward, and/or tilt. The lower body support members and the upper body support members may be simultaneously actuated to transition from a sitting to a laying position. For example, the lower body support members may actuate forwards while the upper body support members recline to place the passenger in a bed-like configuration (including, e.g., headrests and the like). In some embodiments, the aircraft seat 104 may also include one or more armrests 112 or armrest consoles 112 adjacent to (e.g., on a left or right side) of the lower body support members.

In some embodiments, the passenger seating system 102 may include a structure (e.g., a wall of the passenger seating system 102), an in-flight entertainment 116 display (e.g., adjustably installed on the wall or the like), and a user interface device 114 (e.g., a touchscreen panel 304 and/or one or more buttons 306), some or all of which may be communicatively coupled at any given time. The user interface device 114 may be positioned within the reach of a user seated in the aircraft seat 104.

In some embodiments, the aircraft seat 104 may include the armrest 112 (armrest console). The user interface device 114 may be integrated within the armrest 112 (e.g., armrest console). For example, as illustrated in FIGS. 1-2, the user interface device 114 may be at least partially inserted or embedded within a cavity defined within the armrest 112. In some embodiments, the user interface device 114 may be fully disposed within the cavity. For example, an outer surface of the user interface device 114 may be flush with the surface of the armrest 112 or set slightly below the surface of the armrest 112. By way of another example, the user interface device 114 may be affixed within the recessed section, or it may be reversibly coupled to the structure, so that a user is able to remove the user interface device 114. It is noted herein that the user interface device 114 is not limited to the positioning mentioned above, and may be positioned at any accessible location within the passenger seating system 102.

Figure 3:
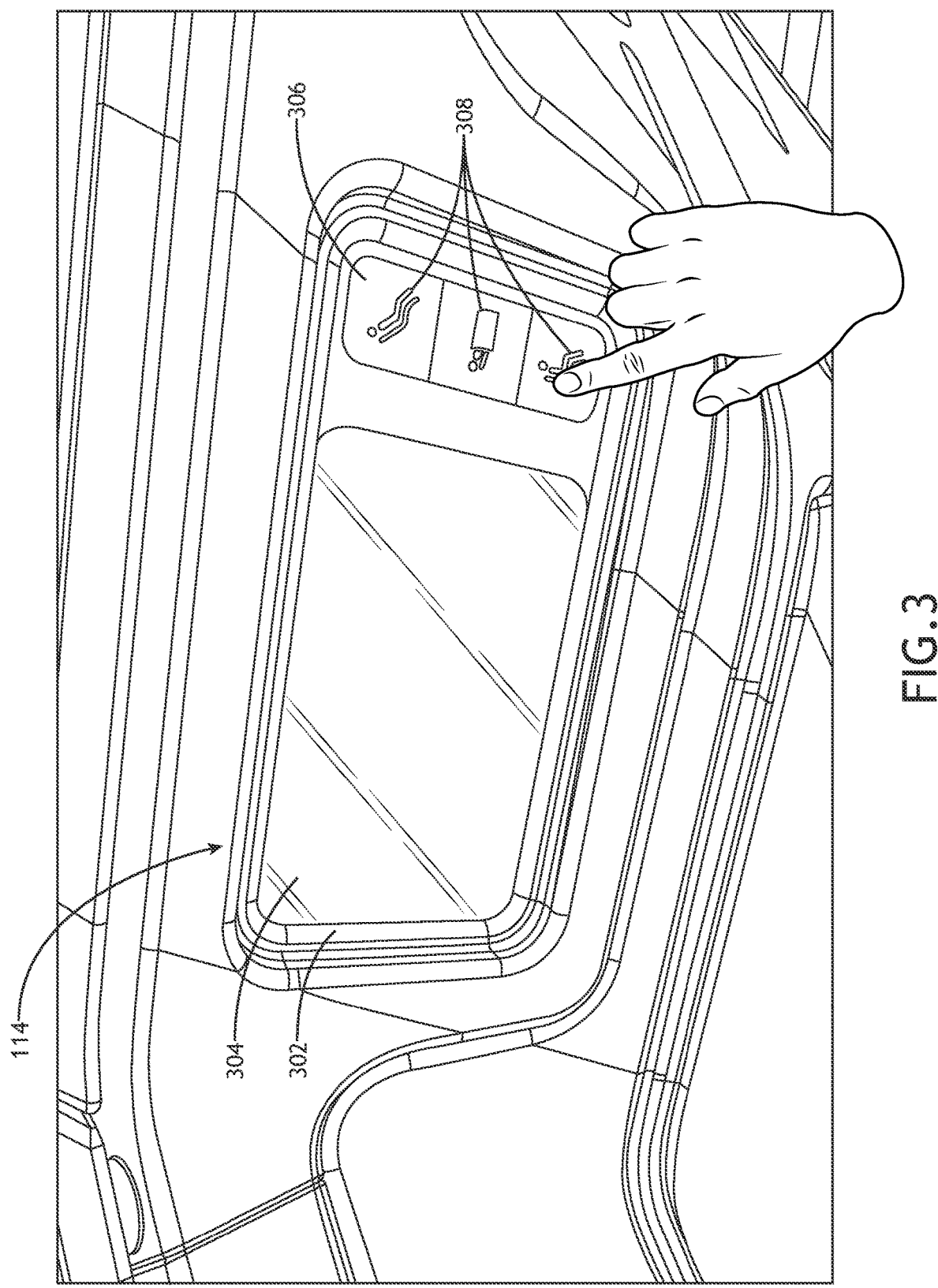
FIG. 3 illustrates a perspective view of a user interface device integrated within the controller feedback system, in accordance with one or more embodiments of the present disclosure.

Referring now to FIG. 3, a perspective view of the user interface device 114 is illustrated, in accordance with one or more embodiments of the present disclosure. For example, the user interface device 114 may include a control panel 302, a touchscreen panel 304, one or more buttons 306, one or more sensors, and/or a controller 500. The user interface device 114 may be configured to generate signals for controlling one or more passenger accessible devices (e.g., passenger chair actuators, in-flight entertainment (IFE) systems 510, temperature control systems 512, power output systems 514, passenger light control systems, flight attendant alert/communication systems, window shades, and/or partition actuators 508, any combination thereof and so forth). It is noted herein that the user interface device 114 may be communicatively coupled to a controller 500.

In some embodiments, the one or more buttons 306 may include one or more icons 308 to indicate a controllable feature to the user. The one or more icons 308 may indicate at least one control action (e.g., actuation of a passenger seat, activation of an IFE system 510, control of a temperature system 512, activation of a power output source 514, or the like) associated with the one or more sensors integrated within the user interface device 114. An outer surface of the one or more buttons 306 may be flush with the surface of the control panel 302 or set slightly below the surface of the control panel 302. For example, the one or more buttons 306 may be raised up such that a top surface of the one or more buttons 306 is elevated higher than the surface of the control panel 302.

In some embodiments, the user interface device 114 may include a capacitive touch interface, touchscreen panel 304, or the like. For example, the touchscreen panel 304 may be configured to display the one or more icons 308 which indicated control actions associated with respective portions of the capacitive touchscreen 304.

In some embodiments, the one or more sensors may be configured to detect a user input associated with the one or more buttons 306. For example, the one or more sensors may be configured for distinguishable detection of a user input (e.g., a user touch, press, hold, or the like). Upon detection of a user touch, the one or more sensors may be configured to transmit a feedback signal to the controller 500, and upon detection of a user press, the one or more sensors may be configured to transmit an activation signal to a controller 500 to activate (and/or identify) the feature associated with the selected one or more buttons 306. It is noted herein that the one or more sensors may include, but are not limited to, proximity switches, pressure-responsive switches, electrical sensors, capacitive touchpads, or any other response interface configured for distinguishable detection of a user touch, press, or hold, which is known in the art. It is noted herein that the user interface device 114 may be used independently or in combination with any other desired user interface known in the art.

In some embodiments, the controller feedback system 100 may include an output jack. For example, the output jack may be integrated within the user interface device 114, an in-flight entertainment (IFE) device, or any other accessible component within the passenger seating system 102. The output jack may receive one or more feedback signals from a controller 500 and convert the one or more feedback signals into auditory feedback via a headset.

In some embodiments, the controller feedback system 100 may include a speaker. For example, the speaker may be coupled to the user interface device 114, an in-flight entertainment (IFE) device, or any other accessible component within the passenger seating system 102. The speaker may be configured to output a feedback message in response to receiving one or more feedback signals from the controller 500.

In some embodiments, the auditory feedback may indicate one or more characteristics of the selected feature to a user. For example, the auditory feedback may include, but is not limited to, notifying the user of the specific feature that is associated with the button that was touched, indicating a status of the selected feature associated with the one or more buttons 306, and/or providing instructions to the user on how to operate the controller 500 (e.g., seat recline button, keep this button pressed to reach bed position, press twice to activate auto bed mode, or the like). It is noted herein that the controller feedback system 100 is not limited to the auditory feedback examples mentioned above, rather, the controller feedback system 100 may be configured to provide auditory feedback to the user in any way that is known in the art, which would assist them while in the aircraft.

Figure 4:
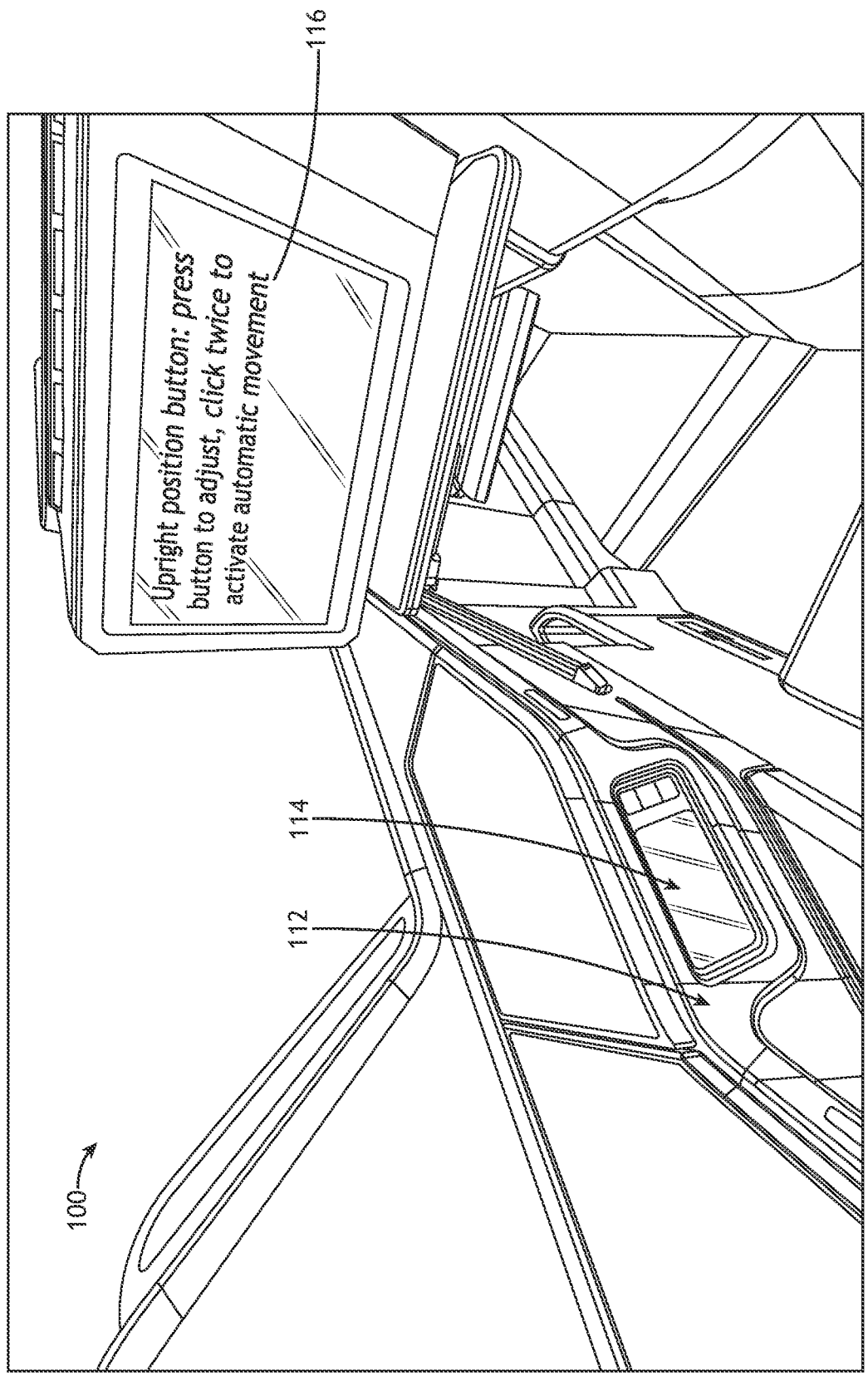
FIG. 4 illustrates a perspective view of the controller feedback system incorporating a display screen, in accordance with one or more embodiments of the present disclosure.

Referring now to FIG. 4, a perspective view of the controller feedback system 100 incorporating a display screen 116 is illustrated, in accordance with one or more embodiments of the present disclosure. For example, the display screen 116 may include, but is not limited to an in-flight entertainment (IFE) display 116. In some embodiments, the display screen 116 may be configured to receive a feedback signal from the controller 500 in response to a user touch of the one or more buttons 306. For example, the display screen 116 may be configured to convert the feedback signal into visual feedback. The visual feedback may include, but is not limited to, notifying the user of the specific feature that is associated with the button that was touched, indicating a status of the selected feature associated with the one or more buttons 306, and/or providing instructions to the user on how to operate the controller 500 (e.g., seat recline button, keep this button pressed to reach bed position, press twice to activate auto bed mode, or the like). It is noted herein that the display screen 116 is not limited to the visual feedback examples mentioned above, rather, the display screen 116 may be configured to provide any visual feedback to the user which would assist them while in the aircraft.

It is noted herein that the controller feedback system 100 may be activated via the system 100 as an enhanced-accessibility mode. For example, the enhanced-accessibility mode may be enabled via the user interface device 114 by the user. By way of another example, a crew member may be configured to enable the enhanced-accessibility mode once they have directed a visually impaired passenger to their seat.

In some embodiments, the system 100 may be configured to provide feedback to the user in one or more different languages. For example, at least one of the display screen 116 or the user interface device 114 may be configured to prompt a user to select a desired language once activated.

Figure 5A:
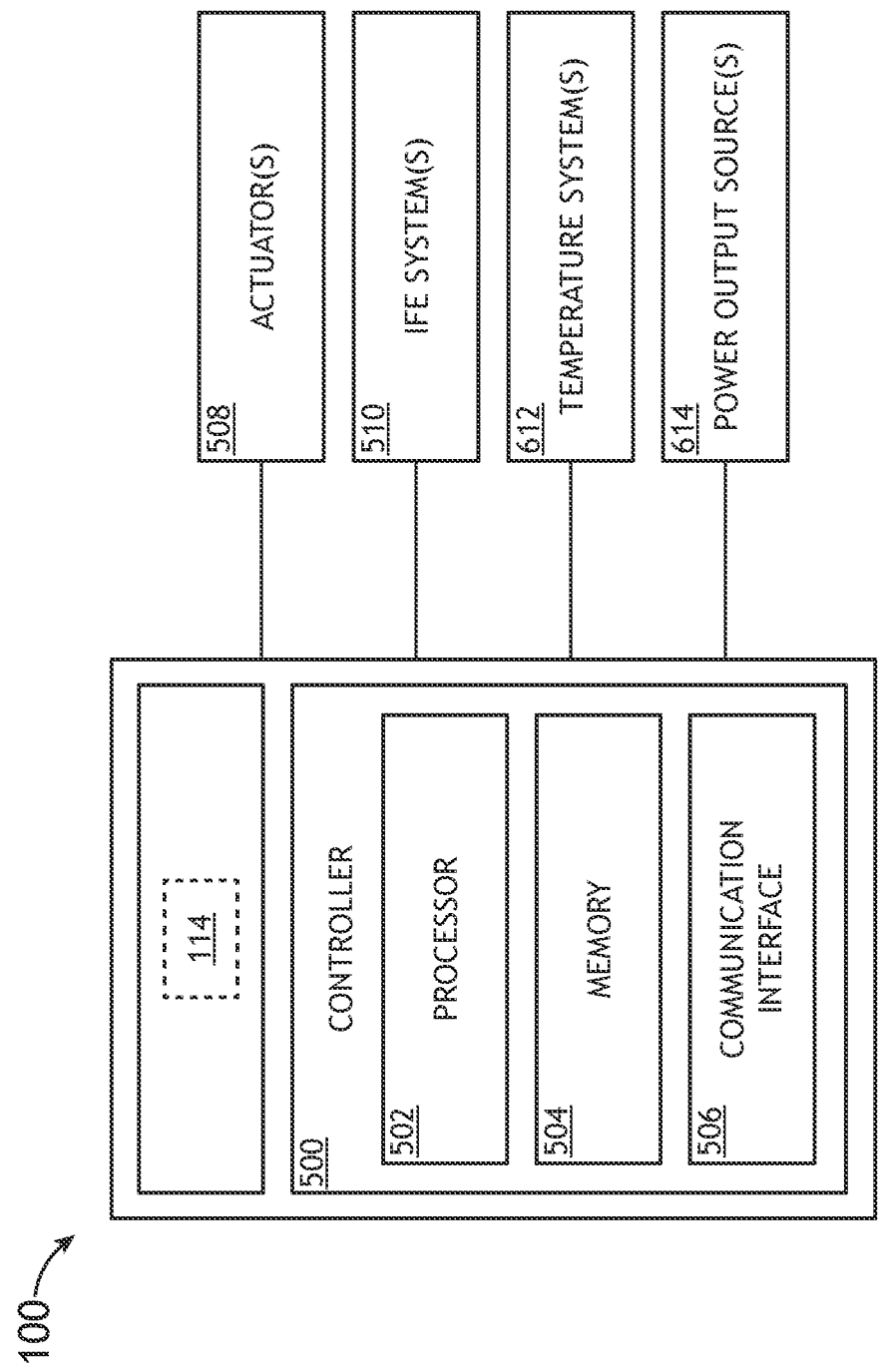
FIG. 5A illustrates a block diagram of a controller being communicatively coupled to the user interface device, in accordance with one or more embodiments of the present disclosure.
Figure 5B:
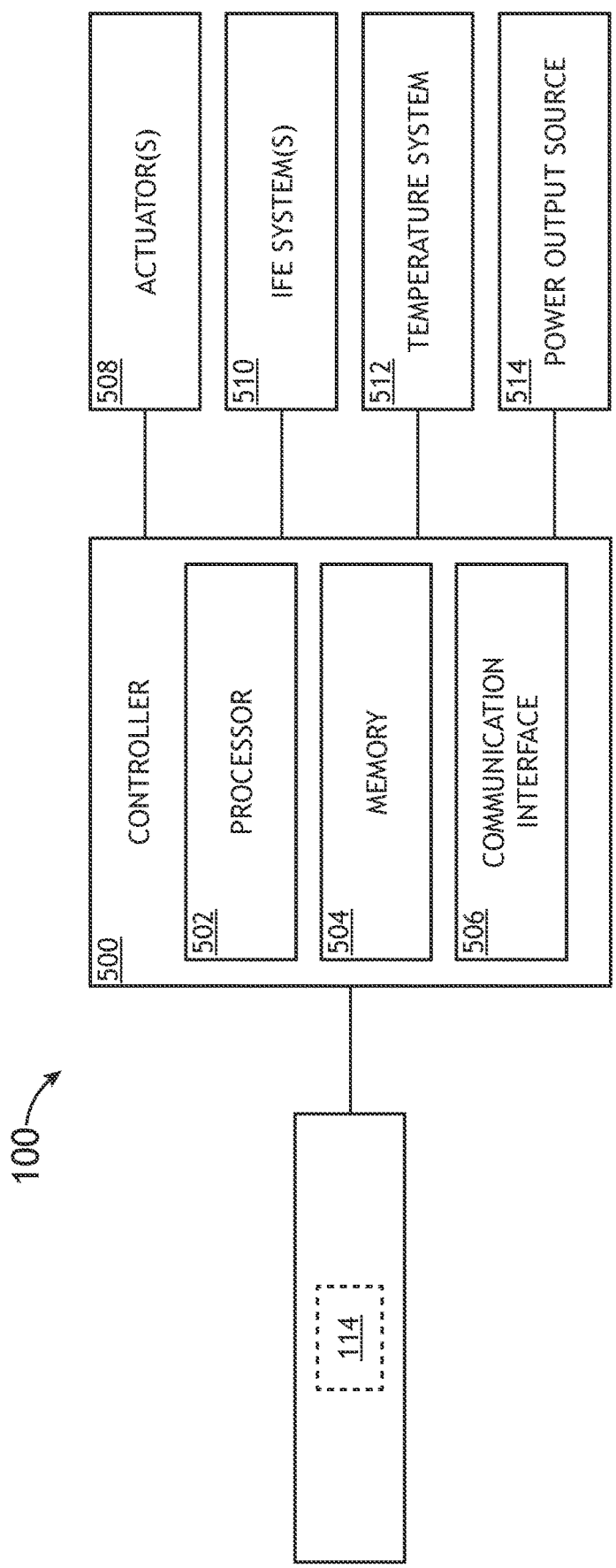
FIG. 5B illustrates a block diagram of a controller being communicatively coupled to the user interface device, in accordance with one or more embodiments of the present disclosure.

FIGS. 5A-5B illustrate block diagrams of a controller 500 being communicatively coupled to the user interface device 114, in accordance with one or more embodiments of the present disclosure. In some embodiments, the user interface device 114 may include an integrated controller 500 (e.g., as shown in FIG. 5A) or may be communicatively coupled to the controller 500 (e.g., as shown in FIG. 5B). For example, the controller 500 may be embedded in or connected to the user interface device 114, or the controller 500 may be communicatively coupled to the user interface device 114 via one or more signal paths. These configurations are provided as examples; however, it is contemplated that variations on connectivity of the user interface device 114 may be implemented (e.g., including, but not limited to, wireless connectivity or a mixture of wired and wireless connectivity) without departing from the scope of this disclosure. Furthermore, any number of controllers 500 may be implemented. For example, the user interface device 114 may include an integrated controller 500 or may be coupled to a respective controller 500 which communicates with another controller (e.g., for the various passenger-accessible devices).

In some embodiments, the controller 500 includes a processor 502, memory 504 and/or a communication interface 506. The processor 502 provides processing functionality for at least the controller 500 and may include any number of processors, micro-controllers, circuitry, field programmable gate array (FPGA) or other processing systems, and resident or external memory for storing data, executable code, and other information accessed or generated by the controller 500. The processor 502 may execute one or more software programs embodied in a non-transitory computer readable medium (e.g., memory 504) that implement techniques described herein. The processor 502 is not limited by the materials from which it is formed or the processing mechanisms employed therein and, as such, may be implemented via semiconductor(s) and/or transistors (e.g., using electronic integrated circuit (IC) components), and so forth.

The memory 504 may be an example of tangible, computer-readable storage medium that provides storage functionality to store various data and/or program code associated with operation of the controller 500/processor 502, such as software programs and/or code segments, or other data to instruct the processor 502, and possibly other components of the controller 500, to perform the functionality described herein. Thus, the memory 504 may store data, such as a program of instructions for operating the controller 500, including its components (e.g., processor 502, communication interface 506, etc.), and so forth. It should be noted that while a single memory 504 is described, a wide variety of types and combinations of memory (e.g., tangible, non-transitory memory) may be employed. The memory 504 may be integral with the processor 502, may include stand-alone memory, or may be a combination of both. Some examples of the memory 504 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 506 may be operatively configured to communicate with components of the controller 500. For example, the communication interface 506 may be configured to retrieve data from the processor 502 or other devices (e.g., user interface device 114, actuator(s) 508, in-flight entertainment (IFE) system(s) 510, temperature system(s) 512, and/or power output source(s) 514), transmit data for storage in the memory 504, retrieve data from storage in the memory 504, and so forth. The communication interface 506 may also be communicatively coupled with the processor 502 to facilitate data transfer between components of the controller 500 and the processor 502. It should be noted that while the communication interface 506 is described as a component of the controller 500, one or more components of the communication interface 506 may be implemented as external components communicatively coupled to the controller 500 via a wired and/or wireless connection. In some embodiments, the communication interface 506 may include or couple to a transmitter, receiver, transceiver, physical connection interface, or any combination thereof.

In some embodiments, the user interface device 114 is configured to generate signals for controlling one or more actuators 508 of an aircraft seat 104, window shade, partition, or any other automated/semi-automated passenger-accessible device, IFE systems 510, temperature systems 512, power output sources 514, and/or any other passenger-accessible device. The controller 500 may be configured to receive the signals from the user interface device 114 and generate instructions and/or control signals based on the user interface device 114 signals. The controller 500 may be further configured to transmit the instructions and/or control signals to the one or more actuators 508, IFE systems 510, temperature systems 512, power output sources 514, and/or other passenger-accessible devices. In some embodiments, the controller 500 is configured to transmit the instructions and/or control signals directly to the one or more actuators 508, IFE systems 510, temperature systems 512, power output sources 514, and/or other passenger-accessible devices. In other embodiments, the controller 500 is configured to transmit the instructions and/or control signals to at least one other controller or control system that is configured to control the one or more actuators 508, IFE systems 510, temperature systems 512, power output sources 514, and/or other passenger-accessible device.

In some embodiments, the controller 500 may be further configured to receive information from the one or more passenger-accessible devices. For example, the controller 500 may receive information regarding a display or audio content output (e.g., movie, TV show, flight information, game, safety alert, etc.). In some embodiments, the controller 500 may be configured to at least partially disable the user interface device 114 when safety alerts or other alerts that are directed at all passengers are broadcast or provided. In embodiments where the responsive interface is a touchscreen panel 304, the controller 500 may be configured to modify the plurality of icons 308 based on the content being output. In some embodiments, the controller 500 may also be configured to provide visual feedback through the touchscreen panel 304 (e.g., to indicate volume, track bar display, lights on/off, actuator positions, etc.) based upon user inputs to the user interface device 114 and/or information received from the one or more passenger-accessible devices being controlled.

As such, it would be beneficial to provide a controller feedback system 100. The controller feedback system 100 including one or more sensors configured for distinguishable detection of a user input. This will aid in providing a visually impaired user a sense of independence and privacy within the passenger seating system 102 of the aircraft. Accordingly, embodiments of the present disclosure are directed to an integrated aircraft seat control panel 302 with recessed buttons configured to allow a user to operate at least one aircraft seat function without limiting user access to controls.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat controller feedback system, comprising:
    a user interface device, comprising:
        a control panel operatively associated with an aircraft seat;
        one or more buttons integrated within the control panel, wherein each button of the one or more buttons is configured to indicate a controllable feature within an aircraft to a user;
        an output jack integrated within the control panel; and
        one or more sensors coupled to the one or more buttons, wherein the one or more sensors are configured for distinguishable detection of a user input, wherein the user input includes each of a user touch, press, and hold; and
    a controller communicatively coupled to the user interface device, wherein the controller is configured to generate one or more signals in response to an interaction with the user interface device,
    wherein the controller is configured to transmit one or more feedback signals to one or more feedback devices in response to a user touch, wherein the one or more feedback devices include the output jack, wherein the output jack is configured to receive the one or more signals from the controller and convert the received one or more signals into auditory feedback via a headset, wherein the auditory feedback includes an auditory message indicating the feature associated with the one or more buttons,
    wherein the controller is configured to transmit one or more activation signals to one or more components of the aircraft seat in response to a user press.

2. The aircraft seat controller feedback system of claim 1, wherein the one or more feedback devices include a display screen.

3. The aircraft seat controller feedback system of claim 2, wherein the display screen is communicatively coupled to the controller, wherein the display screen is configured to receive the one or more feedback signals from the controller and convert the received one or more feedback signals into visual feedback displayed via the display screen.

4. The aircraft seat controller feedback system of claim 3, wherein the visual feedback includes at least one message displayed on the display screen indicating the feature associated with the one or more buttons.

5. The aircraft seat controller feedback system of claim 1, wherein the one or more feedback devices are configured to indicate a current status of the feature to the user.

6. The aircraft seat controller feedback system of claim 1, wherein the user interface device includes an enhanced accessibility mode which is configured to be at least one of enabled or disabled.

7. The aircraft seat controller feedback system of claim 1, wherein the one or more buttons are embedded into the control panel such that a top surface of the one or more buttons is flush with a top surface of the control panel.

8. The aircraft seat controller feedback system of claim 1, wherein the one or more components of the aircraft seat include at least one of an actuator of the aircraft seat, an in-flight entertainment system, a temperature setting of a passenger seating system, or a power output source.

9. A passenger seating system, comprising:
an aircraft seat, the aircraft seat comprising:
- a seat frame configured to actuate between at least an upright position and a bed position;
- at least one power output configured to drive an actuation of the seat frame;
- a user interface device at least partially embedded in cavity defined within an armrest console of the aircraft seat, wherein the cavity is accessible via at least one exterior surface of the armrest console, the user interface device comprising:
  - a control panel operatively associated with the aircraft seat;
  - one or more buttons integrated within the control panel, wherein each button of the one or more buttons is configured to indicate a controllable feature within an aircraft to a user;
  - an output jack integrated within the control panel; and
  - one or more sensors coupled to the one or more buttons, wherein the one or more sensors are configured for distinguishable detection of a user input, wherein the user input includes each of a user touch, press, and hold; and
- a controller communicatively coupled to the user interface device, wherein the controller is configured to generate one or more signals in response to an interaction with the user interface device,
wherein the controller is configured to transmit one or more feedback signals to one or more feedback devices in response to a user touch, wherein the one or more feedback devices include the output jack, wherein the output jack is configured to receive the one or more signals from the controller and convert the received one or more signals into auditory feedback via a headset, wherein the auditory feedback includes an auditory message indicating the feature associated with the one or more buttons,
wherein the controller is configured to transmit one or more activation signals to one or more components of the aircraft seat in response to a user press.

10. The passenger seating system of claim 9, wherein the one or more feedback devices include a display screen.

11. The passenger seating system of claim 10, wherein the display screen is communicatively coupled to the controller, wherein the display screen is configured to receive the one or more feedback signals from the controller and convert the received one or more feedback signals into visual feedback displayed via the display screen.

12. The passenger seating system of claim 11, wherein the visual feedback includes at least one message displayed on the display screen indicating the feature associated with the one or more buttons.

13. The passenger seating system of claim 9, wherein the one or more feedback devices are configured to indicate a current status of the feature to the user.

14. The passenger seating system of claim 9, wherein the user interface device includes an enhanced accessibility mode which is configured to be at least one of enabled or disabled.

15. The passenger seating system of claim 9, wherein the one or more buttons are embedded into the control panel such that a top surface of the one or more buttons is flush with a top surface of the control panel.

16. The passenger seating system of claim 9, wherein the one or more components of the aircraft seat include at least one of an actuator of the aircraft seat, an in-flight entertainment system, a temperature setting of the passenger seating system, or a power output source.

* * * * *